(12) United States Patent
Hambitzer et al.

(10) Patent No.: US 10,637,096 B2
(45) Date of Patent: Apr. 28, 2020

(54) ELECTROCHEMICAL BATTERY CELL

(71) Applicant: Hambitzer GmbH, Pfinztal (DE)

(72) Inventors: Guenther Hambitzer, Pfinztal (DE);
Laurent Zinck, Mothern (FR); Heide Biollaz, Waldshut-Tiengen (DE);
Markus Borck, Stuttgart (DE);
Christiane Ripp, Pfinztal (DE)

(73) Assignee: Hambitzer GmbH, Pfinztal (DE)

( * ) Notice: Subject to any disclaimer, the term of this patent is extended or adjusted under 35 U.S.C. 154(b) by 455 days.

(21) Appl. No.: 14/479,625

(22) Filed: Sep. 8, 2014

(65) Prior Publication Data

US 2014/0377642 A1    Dec. 25, 2014

Related U.S. Application Data

(60) Continuation of application No. 13/197,369, filed on Aug. 3, 2011, now Pat. No. 8,858,655, which is a
(Continued)

(30) Foreign Application Priority Data

Sep. 23, 2003   (DE) .................................. 103 43 862

(51) Int. Cl.
*H01M 10/0563* (2010.01)
*H01M 2/18* (2006.01)
(Continued)

(52) U.S. Cl.
CPC ......... *H01M 10/0563* (2013.01); *H01M 2/14* (2013.01); *H01M 2/18* (2013.01);
(Continued)

(58) Field of Classification Search
CPC ........... H01M 10/0525; H01M 10/054; H01M 10/0563; H01M 10/058; H01M 10/0585;
(Continued)

(56) References Cited

U.S. PATENT DOCUMENTS 4,052,537 A    10/1977  Mallory
4,283,469 A *  8/1981  Goebel .................. H01M 6/14
                                                        429/246
(Continued)

FOREIGN PATENT DOCUMENTS

DE    19911800 C1    11/2000
DE    10110716 A1    9/2002
(Continued)

OTHER PUBLICATIONS

K. Pinkwart, "Model for the behavior of the covering layer and the morphology of lithium in inorganic electrolyte solution," Die Deutsche Biblithek, 2000, pp. 1-139.

*Primary Examiner* — Adam A Arciero
(74) *Attorney, Agent, or Firm* — Mintz Levin Cohn Ferris Glovsky and Popeo, P.C.; Peter F. Corless; Steven M. Jensen

(57) ABSTRACT

An electrochemical battery cell having a negative electrode, an electrolyte containing a conductive salt, and a positive electrode, the electrolyte being based on $SO_2$ and the intermediate chamber between the positive electrode and the negative electrode being implemented such that active mass deposited on the negative electrode during the charging of the cell may come into contact with the positive electrode in such manner that locally delimited short-circuit reactions occur on its surface.

29 Claims, 5 Drawing Sheets

Related U.S. Application Data division of application No. 10/572,935, filed as application No. PCT/DE2004/002105 on Sep. 21, 2004, now abandoned.

(51) Int. Cl.

| | | |
|---|---|---|
| *H01M 2/14* | (2006.01) | |
| *H01M 4/13* | (2010.01) | |
| *H01M 4/525* | (2010.01) | |
| *H01M 4/587* | (2010.01) | |
| *H01M 10/0525* | (2010.01) | |
| *H01M 10/058* | (2010.01) | |
| *H01M 10/0585* | (2010.01) | |
| *H01M 4/139* | (2010.01) | |
| *H01M 4/62* | (2006.01) | |
| *H01M 10/054* | (2010.01) | |
| *H01M 2/16* | (2006.01) | |

(52) U.S. Cl.
CPC ............. *H01M 4/13* (2013.01); *H01M 4/139* (2013.01); *H01M 4/525* (2013.01); *H01M 4/587* (2013.01); *H01M 10/058* (2013.01); *H01M 10/0525* (2013.01); *H01M 10/0585* (2013.01); *H01M 2/1646* (2013.01); *H01M 4/62* (2013.01); *H01M 10/054* (2013.01); *Y02E 60/122* (2013.01); *Y10T 29/49108* (2015.01)

(58) Field of Classification Search
CPC ........ H01M 2/14; H01M 2/1646; H01M 2/18; H01M 4/13; H01M 4/139; H01M 4/525; H01M 4/587; H01M 4/62
See application file for complete search history.

(56) References Cited

U.S. PATENT DOCUMENTS

| | | | |
|---|---|---|---|
| 4,567,031 A | | 1/1986 | Riley |
| H496 H | | 5/1988 | Mammone et al. |
| 5,006,428 A | | 4/1991 | Goebel et al. |
| 5,595,837 A | | 1/1997 | Olsen et al. |
| 6,159,635 A | * | 12/2000 | Dasgupta ................ H01M 4/13 429/216 |
| 6,180,282 B1 | * | 1/2001 | Nishida .................. H01M 4/13 429/137 |
| 6,596,440 B2 | | 7/2003 | Gavelin et al. |
| 6,709,789 B1 | | 3/2004 | Hambitzer et al. |
| 6,730,441 B1 | * | 5/2004 | Hambitzer ........ H01M 10/0564 429/199 |
| 2003/0049524 A1 | | 3/2003 | Spillman et al. |
| 2004/0103526 A1 | | 6/2004 | Erhardt et al. |

FOREIGN PATENT DOCUMENTS

| | | |
|---|---|---|
| EP | 0468942 A2 | 1/1992 |
| EP | 0767506 A1 | 4/1997 |
| JP | 59149654 | 8/1984 |
| WO | 0044061 | 7/2000 |
| WO | 0079631 A1 | 12/2000 |
| WO | 0209213 A1 | 1/2002 |
| WO | 03077328 A2 | 9/2003 |

* cited by examiner

ELECTROCHEMICAL BATTERY CELL

This application is a continuation of U.S. Ser. No. 13/197,369, filed Aug. 3, 2011, which is a divisional of U.S. application Ser. No. 10/572,935, filed Mar. 22, 2006, which is a 371 of PCT/DE04/02105, filed Sep. 21, 2004, which claims priority to German Application 1033862.9, filed Sep. 23, 2003. All these applications are incorporated herein by reference.

The present invention relates to an electrochemical battery cell having a negative electrode (cathode), an electrolyte containing a conductive salt, and a positive electrode (anode). In particular, the present invention is directed to alkali metal cells in which the active mass is an alkali metal which is stored in and/or on the negative electrode during charging of the cell. The active mass may, however, also be another metal, in particular an alkaline earth metal, or a metal of the second group of the periodic system. The conductive salt of the electrolyte comprises cations of the metal of the active mass and suitable anions. In the case of alkali metal cells, a tetrahalogenated aluminate of the alkali metal, such as $LiAlCl_4$, is preferably used.

Hereafter, reference is primarily made to alkali metal cells, in particular lithium cells, as an example. However, this is not to be understood as a restriction of the general applicability of the present invention.

Typical for cells of this type is a design in which a plurality of layers, having dimensions of their main surfaces much greater than their thickness, is positioned one above the other. They have approximately equally sized main surface dimensions and are positioned in the cell one on top of another in a sandwich like arrangement. Common shapes are prismatic cells typically having a cuboid housing and straight layers and cylindrical cells in which the layers are wound up in rolls.

Typical cells have at least three layers, namely the negative electrode, the positive electrode, and a separator, which electrically and mechanically separates the two electrodes. The separator has to meet difficult requirements:

It has to provide electrical separation of positive and negative electrodes. Without such electrical separation the operation of a battery cell is not possible.

It should contribute to a uniform distribution of the liquid electrolyte between the electrodes.

It has to provide mechanical separation of the anode chamber and the cathode chamber, but, at the same time, has to provide the required electrolyte transport and also gas transport between the two partial chambers of the cells.

It has to prevent reliably short circuits between the electrodes. This is in particular true if, during charging of the cell, the active metal is deposited on the surface of the electrode.

The latter problem is especially critical if the active mass, in particular after a plurality of charging and discharging cycles, is not deposited as a smooth layer with an even surface, but rather in a sectionally filamentous structure. Especially in the case of alkali metal cells, in particular lithium cells, unbranched filaments having (for a specific cell with a specific electrolyte) a typical essentially equal diameter are formed during charging of the cell. These filaments grow through one another forming tangles and are referred to as whiskers. The formation of the whiskers is attributed to a thin cover layer which is generated on the surface of the reactive active metal as a result of a self-discharge reaction. This layer is not completely uniform whereby the electrolytically deposited active metal preferentially grows at the thinner points through the cover layer and then further at the end of the particular filament.

The separator is subject to strong mechanical stress due to the formation of such filamentous structure. In addition, the selection of suitable materials is restricted by further requirements:

The separator material must be inert in the cell;

it must be as thin as possible in order to allow a high energy density;

the performance data of the cell and its service life are partially determined by the permeability of the separator for the electrolyte ions;

the cost of the separator must be tolerable.

A perfectly functioning separator is especially important in lithium ion cells and lithium polymer cells. If in such cells lithium metal is deposited on the surface of the negative electrode, contact of the highly reactive metal with the positive electrode must be avoided with certainty, because the short-circuit caused by such a contact would immediately result in an uncontrolled reaction sequence called "thermal runaway". The organic electrolyte solution of such cells would combust uncontrollably or even explode. Because of these risks, these cell types are typically only produced in relatively small sizes. Furthermore, additional safety measures, mainly electronic safety measures, are used.

In these cell types, the negative electrode is typically an "insertion electrode". This term generally refers to electrodes which contain the active metal in their interior in such am manner that it is ready for the exchange with the electrolyte during charging and discharging of the cell. In lithium ion and lithium polymer cells, the negative electrode is an insertion electrode based on graphite, and metal ions of the conductive salt are stored therein during charging of the cell. If possible, the cell is to be operated in such am manner that operating states in which active metal is deposited on the surface of the electrode are avoided. However, this may in practice only be achieved using complex electronic means, by which overcharging of the cell and charging at relatively high currents (above a limiting value valid for the particular cell) are reliably avoided. The electronics must be extremely precise (cutoff voltage 4.2 V±0.01 V, for example) and extremely reliable (at most one defect per 100 million parts). The cost is substantially increased by such measures. Nonetheless, certain risks remain.

On this basis, the present invention addresses the technical problem to provide a rechargeable electrochemical battery cell, in particular an alkali metal cell and above all a lithium cell, which satisfies the highest possible safety standard at the lowest possible cost, while the advantageous properties of the particular cell type (in the case of lithium cells, in particular their unmatched high energy density) are fully retained or even improved.

The object is achieved according to a first main aspect of the present invention by an electrochemical battery cell having a negative electrode, an electrolyte containing a conductive salt, and a positive electrode, wherein the electrolyte is based on $SO_2$ and the space between the positive electrode and the negative electrode is so designed that active mass deposited on the negative electrode during the charging of the cell may come into contact with the positive electrode in such am manner that locally limited short-circuit reactions occur on the electrode surface.

In the context of the present invention, it has been experimentally established that battery cells containing an electrolyte based on $SO_2$, show a completely unexpected short-circuit behavior when active metal deposited on the surface of the negative electrode comes into contact with the positive electrode. If by suitable measures such short circuits are locally delimited, the reactions occurring in this case neither result in a "thermal runaway" nor do irreversible reactions occur, by which a part of the active metal is passivated and the charging capacity of the cell is reduced. Rather, it has been experimentally established that the properties of the cell are not negatively influenced in any way by locally delimited short-circuits of this type and the reactions connected thereto. Thus the cell of the present invention operates without a separator. Instead, it is designed in such am manner that local contacts of active mass deposited on the negative electrode during charging of the cell with the positive electrode are permitted in a purposive manner. This represents a substantial deviation from currently typical cell constructions.

As noted, these observations apply to cells having an electrolyte based on $SO_2$. An electrolyte is designated as "$SO_2$-based" if it contains $SO_2$ not only as an additive in low concentrations, but rather the mobility of the ions of the conductive salt which is contained in the electrolyte and causes the charge transport, is at least partially ensured by the $SO_2$. Further information in this regard may be taken from WO 00/79631 and the documents cited therein.

According to the experiments on which the present invention is based, the local short-circuits and the resulting heating of the electrolyte results in the formation of compounds of the active metal with the $SO_2$, in the case of a lithium cell the formation of lithium dithionite ($Li_2S_2O_4$). Although this compound has relatively poor solubility, none of the starting products consumed in the reaction (Li and $SO_2$) are permanently withdrawn from the cell function, because the formation of the dithionite is compensated by a dissolution reaction which is sufficiently rapid to result in an equilibrium which is advantageous for the cell function. More detailed information in this regard may also be taken from WO 00/79631.

In addition, a reaction with the positive electrode may occur in the vicinity of the local short-circuits. This is in particular true for cells in which the positive electrode contains a metal oxide, in particular an oxide of a transition metal of the atomic numbers 22 to 28. The oxide is preferably provided as an intercalation compound made of the active metal, one of the transition metals mentioned, and oxygen. Among the transition metals cobalt, nickel, and iron are especially preferred. Binary and ternary metal oxide intercalation compounds, which contain two or three different transition metals in the lattice structure, also have practical significance. With respect to these electrode materials which are especially preferred in the present invention, reference for further details may again be made to WO 00/79631 and to U.S. Pat. No. 4,567,031 cited therein. For example, if a positive electrode based on cobalt oxide is used, the following reaction occurs, according to the findings of the inventors, as a result of the local short-circuits:

$CoO_2 + Li \rightarrow LiCoO_2$

This reaction corresponds to the intercalation of the active metal during the discharging of the cell.

Mainly in two operating states is metallic lithium deposited on the negative electrode in such am manner that it may contact the positive electrode if no separator is present, namely during charging at especially high current or during overcharging, i.e., when the amount of electrical charge applied during charging exceeds the capacity of the negative electrode. In these operating states, a short-circuit reaction which corresponds to the discharge of the cell is not only not disadvantageous, but rather even advantageous. The local short-circuits thus even have favorable results and may be referred to as "beneficial shortcuts".

In summary it has been established during the experimental testing of the present invention that very good results both with respect to safety and also with respect to the cell data (cycle stability, capacity, etc.) are achieved using the separator-free cell design.

Among others, the following advantages are achieved:
The internal resistance of the cell is reduced because the separator, which has very fine pores and tends to have the pores clogged, is not present.
The safety is substantially improved because the risks which, in conventional cells, relate to damage of the separator do not exist.
The cost is reduced because the typical separator materials represent a substantial cost factor.
The weight and volume of the cell are reduced so that increased energy and power density may be achieved.
The cell may be charged at high current and therefore rapidly, because the risk relating to the deposition of active metal on the cell surface does not exist.
Standard production facilities, for example those existing for lithium ion cells, may be used.

It is required that the short-circuits and any reactions caused by the heating which results from the short-circuits, be locally delimited by suitable measures.

In order to achieve this end, a porous insulator layer is preferably provided, which is positioned and implemented in such am manner that active mass deposited on the negative electrode during charging of the cell may grow through the pores of the insulator layer up to the surface of the positive electrode. The porous insulator layer is preferably in direct contact with the positive electrode, the surfaces of both contacting each other over their entire areas.

The pores of the insulator layer must be sufficiently large to permit the desired growth of the active mass through the layer and up to the surface of the positive electrode. In addition, the structure and the arrangement in relation to the positive electrode must be such that the contact between the active mass and the positive electrode is restricted to local sites (partial areas) of the electrode surface, so that only local short-circuits occur which do not lead to a reaction of further lithium (which is present in the porous insulator layer or at other parts of its boundary to the negative electrode). If a local short-circuit triggers further short-circuits, an uncontrolled reaction of the lithium, i.e. a "thermal runaway", would have to be expected due to the strong temperature increase.

A suitable structure of the porous insulator layer must be established individually for each particular cell construction. It is to be taken into account that the diameter of the whiskers formed during deposition of the lithium is different from cell to cell. This is shown especially clearly by comparing cells operating with different electrolytes. If an organic electrolyte is used, the whiskers generally have substantially larger diameters than if an electrolyte based on $SO_2$ is used. Therefore, it is well possible that a layer having a specific porosity prevents the penetration (growing through) of whiskers in a first cell construction, thus acting as a separator, while in another cell, the same layer is penetrated by the deposited active mass.

For this and other reasons, it is practically impossible to provide numerical values or other quantitative information about the pore size of suitable insulator layers. In addition, typical specification data of manufacturers of porous layer materials, such as "average pore size" and "maximum pore size" can in the present case not be used for characterizing suitable layer materials, because the pore size distribution is of substantial significance. For example, a layer which has a high percentage of extremely fine pores, but has a sufficient number of coarser pores through which the active mass may grow, may be suitable. The suitability of a layer material for fulfilling the function described here can, however, be tested experimentally without problems, as will be described in greater detail below.

The porous insulator layer can, for example, be embodied as a self-supporting film, as a porous composite structure made of particles, fibers, or microtubes connected by a binder, or even as a loose pourable product. In any case it is advantageous if the layer is wetted well, so that the electrolyte solution penetrates easily into the layer. The porous insulator layer preferably contains a particulate, fibrous, or tubular pore structure material, which may in particular be formed from oxides, carbides, or chemically stable silicates. An especially suitable binder is a terpolymer made of tetrachloroethane, hexafluoropropylene, and vinylidene fluoride.

The porous insulator layer does not necessarily have to be a separate layer, which may be distinguished from other functional layers of the cell. This is in particular true for a preferred embodiment of the present invention, in which the negative electrode comprises a combination of a planar, electronically conductive substrate, for example in the form of a metallic sheet, foam, or fabric, and of a nonconductive deposition layer bonded to the substrate, which deposition layer is formed and positioned in such am manner that active mass deposited on the surface of the substrate penetrates into its pores and is deposited further therein. Such a design is known from WO 02/09213, to which reference is made in this regard. However, in contrast to the cell construction described therein, according to the present invention no barrier layer impermeable to the active mass is provided between the deposition layer and the positive electrode. The porous insulator layer advantageous for the localization of the short-circuits unavoidably occurring as a result of the lack of the barrier layer, may be an integral (undistinguishable) component of the deposition layer or may be formed by a separate layer, which runs between the deposition layer and the positive electrode and is bonded continuously and over the entire area to the deposition layer.

In general, the present invention has particular advantages in cell designs in which the negative electrode is such that during charging of the cell, positive metal ions of the conductive salt are taken up into its interior. In cells of this type, during normal charging of the cell, there is initially no deposition of active metal on the electrode surface, but rather the storage of the active metal during the charging procedure occurs in the interior of a structure which is a component of the negative electrode. Electrode types for which this condition applies are here generally designated as "insertion electrodes". The construction explained above—having a flat, electronically conductive substrate and a deposition layer bonded thereto, having pores into which the active mass is taken up during charging—is to be understood as an insertion electrode according to this general definition.

According to a further variation, the taking up of the positive metal ions refers to the interior of an electrically conductive electrode mass which is a component of the negative electrode. Important examples of such an electrically conductive electrode mass are electrodes containing carbon, in particular graphite electrodes, as are also used for lithium-ion cells. In this case, the lithium is during the charging not stored by deposition in porous cavities, but rather by intercalation in the lattice structure of the electrically conductive electrode mass. In addition to the mentioned graphite electrodes, lithium intercalation electrodes based on $Li_4Ti_5O_{12}$ or alloy electrodes may be mentioned as examples of such electrode materials.

In cell designs of this type it is mandatory that a separate porous insulator layer is provided to prevent direct electrical contact, and therefore short-circuits, between the negative and the positive electrodes (i.e., their respective conductive electrode masses). Such a design is described in greater detail infra on the basis of the figures.

A second main aspect of the invention relates to a manufacturing method for an electrochemical battery cell, in particular a cleaning step occurring within such a method. In this method an electrode of the cell is optimized for its function by removing $OH^-$ ions bonded to the electrode. The method is in particular suitable for manufacturing a battery cell according to the first main aspect of the present invention, but also has independent significance.

According to the second main aspect, the $OH^-$ ions are removed from the electrodes using a cleaning agent which contains a first cleaning component reacting with $OH^-$ ions. It is contacted with the electrode in such am manner that $OH^-$ ions bonded thereto are removed from the electrode surface by reaction with the first cleaning component, and components of the cleaning agent or reaction products which may interfere with the function of the cell are removed from the electrode.

For the function of water-free battery cells, i.e., in particular, cells operating with an $SO_2$-based electrolyte, it is very important that water residues present in the electrode structure (both molecular water and also $H^+$ and $OH^-$ ions) are completely removed. This represents a serious problem, in particular if the insertion electrodes explained above are used.

In the context of the present invention, it has been established that the presence of chemically bound water may result in passivation of the electrodes, so that the electrode processes are inhibited. In the case of an insertion electrode, in particular an alkali metal intercalation electrode (e.g., of the type mentioned above, known from WO 00/79631, made of metal-oxide intercalation compounds) this relates to the removal of the alkali metal during charging of the cell and/or the intercalation during discharging. The passivation results in an increase of the internal resistance of the cell.

The inventors have found, that the passivation may be attributed to a reaction of the surface molecules of the electrode with water (e.g., from ambient humidity) resulting in the formation of a cover layer which contains a hydroxide of the active metal, i.e., in the case of an alkali metal A, a compound of the type AOH. Even small traces of water result in the formation of a hydroxide cover layer. According to the knowledge of the present inventors, the formation of a cover layer may hardly be avoided during manufacturing of electrodes whose active mass is based on a metal-oxide intercalation compound, in particular $LiCoO_2$. This relates not only to the outer surface of the electrodes, but rather (in the typical case of a porous electrode material) also to its inner surface (inside the pores). The passivation of the electrodes may be removed by reaction with the cleaning component, which reacts with $OH^-$ ions and is designated here as the first cleaning component. The first cleaning component is also referred to hereafter as an activation component. This shall, however, not be understood as limiting.

The second main aspect of the present invention also refers to an insertion electrode, in particular an intercalation electrode, having a surface which is essentially free of $OH^-$ ions. Preferably, the electrode is also essentially free of $H^+$ ions. An electrochemical cell which contains such an electrode is also a subject matter of the present invention. In this case "essentially free of $OH^-$ ions and/or $H^+$ ions" is to be understood to mean that the passivation of the electrode caused by the presence of the ions, and/or the resulting capacity loss, are reduced to such an extent that the required practical function of the electrode in a battery cell is not impaired thereby. As will be explained in greater detail below, the passivation results in a continuous increase of the internal resistance of the cell during the charging and discharging cycles. The respective properties of the electrode may be observed, for example, using cyclic voltammograms, as will also be explained in greater detail below. The freedom of the surface of the active mass from hydroxide ions is preferably achieved by the method described above using the first cleaning component.

In the context of the present invention, it has been established that insertion electrodes of the type discussed here have a content of chemically bonded water in the order of 10,000 ppm (i.e., 1 weight-percent $H_2O$ in relation to the electrochemically active electrode mass, in particular $LiCoO_2$). An electrode optimized according to the present invention has a water content of at most 5000 ppm, preferably at most 1000 ppm, especially preferably at most 100 ppm, and very especially preferably at most 10 ppm.

A proton-free Lewis acid has been shown to be especially suitable as a first cleaning component. This term refers to a substance which has acid properties as defined by G. N. Lewis (i.e., is an electronic acceptor), but does not contain an $H^+$ ion. Preferred examples of Lewis acids are $AlF_3$, $BF_3$, $CO_2$, $CS_2$ and $GaCl_3$. In general, the suitability of a Lewis acid for the purposes of the present invention can be tested experimentally.

Suitable Lewis acids may be preselected on the basis of their strength, which in turn may be estimated from the difference of the electronegativity values of the atoms forming the acid (for example, Al and F in the case of $AlF_3$). The larger this difference, the stronger the Lewis acid.

The cleaning agent is typically a liquid which contains the first component in a suitable solvent. In particular, aprotic liquids, such as carbon tetrachloride ($CCl_4$) are suitable as the solvent. The required freedom from water of the solvent may be achieved by means of a molecular sieve, in particular based on a metal aluminosilicate having a large surface. In principle, a gas or supercritical fluid, in particular based on supercritical $CO_2$, may also be used as the solvent. The cleaning component may itself be a fluid (e.g., supercritical $CO_2$) or gas (e.g., $CS_2$). In such cases, evidently, the cleaning agent does not have to contain an additional solvent.

The concentration of the activation component in the cleaning agent should be as high as possible, an upper limit resulting, in the case of a solution, from the solubility of the activation component. Typically, a saturated solution is preferred. However, in principle, an activation effect is possible at lower concentrations. The suitable concentration must be experimentally determined in the particular case in connection with the duration of the cleaning treatment and is, of course, also a function of the Lewis acid used. The cleaning agent must in practice fulfill the following conditions:

If the method is applied in such am manner that, during the manufacturing of the cell, at least a part of the cleaning agent remains in the insertion electrodes, the cleaning agent must be harmless for the function of the cell. For harmful components easy and complete removability is mandatory.

The cleaning agent must be compatible with the electrode material. In particular, it may not cause any reaction which interferes with the electrode function.

According to a preferred embodiment, a second cleaning component is used for optimizing insertion electrodes in the manufacturing method. It reacts with $H^+$ ions and is contacted with the insertion electrodes in a cleaning agent in such am manner that $H^+$ ions bonded therein are removed from the interior of the electrode by reaction with the second cleaning component. In the context of the present invention, it has been established that the properties of insertion electrodes, in particular intercalation electrodes of the type described above, may also be impaired if $H^+$ ions (protons) are bound to the electrode material. The protons exchange with the alkali metal ions of the insertion electrodes, thus reducing its capability for taking up active metal (in particular alkali metal) and thereby reducing the electrical capacity of the cell. The protons are, by means of the second cleaning component, extracted from the insertion electrode. Its taking up capacity and therefore also the electrical storage capacity of the cell are thus improved.

In particular, a salt which makes an ion exchange reaction with the protons bound in the insertion electrode is suitable as the second cleaning component. Examples are halogenides, in particular fluorides of an alkali metal, of an alkaline earth metal, or of a metal of the third main group of the periodic system. Without restricting the generality, the term "cleaning salt" is used hereafter for the second cleaning component.

Various variations are possible with respect to both cleaning components and their use in the manufacturing method. For example, at least a partial quantity of the cleaning salt may be introduced into the electrode mass and therefore into the electrode already during its manufacturing. A method in which the first and/or the second cleaning component is not directly introduced into the cleaning agent may also be used. Rather, it is of course also possible that these components are formed in situ using suitable precursor reactions. Examples are salts from which a cleaning salt can be formed by cleaving halogenides, preferably fluorides. This includes in particular salts of the anions $PF_6^-$, $AsF_6^-$, $BF_4^-$ and $AlF_4^-$. Organic salts may also be suitable as starting products for in situ formation of a cleaning salt.

According to a preferred embodiment of this manufacturing method, the $OH^-$ and $H^+$ ions are removed in two stages in two separate steps, in each of which a separate (preferably also different) solvent is used.

In particular, in a first stage, the insertion electrodes may be contacted with a cleaning agent which contains a proton-free Lewis acid in a highly volatile aprotic solvent, such as $CCl_4$. This cleaning agent will be allowed to act until the $OH^-$ ions have been transferred from the electrode into the cleaning agent. It is then removed.

In a second stage, the electrode is contacted with a second cleaning agent which contains the second cleaning component. After completion of the reaction required for the transition of the protons from the electrode into the cleaning agent, the second cleaning agent may also be removed. The resulting optimized electrode must, of course, be further processed in a water-free atmosphere so that its properties are not deteriorated again by absorption of water and its components $OH^-$ and $H^+$.

In principle, the electrolyte of the particular cell may also be used as the solvent of a cleaning liquid. In particular, it may be favorable to introduce a suitable cleaning salt into the cell together with the electrolyte. Since the compounds formed by ion exchange with the protons contained in the insertion electrodes, such as HF and HCl, are volatile, they escape by themselves. This can be accelerated by applying a partial vacuum (evacuation). In such a case, the cleaning liquid does not have to be removed from the cell, but rather remains therein as electrolyte. Remaining residues of the cleaning salt have further positive effects (in addition to the extraction of the $H^+$ ions from the electrode).

The electrodes may, in principle, be treated with the cleaning agent both inside and also outside the cell. In the case of the two-stage method, it may in particular be favorable to perform the first method stage (removal of the $OH^-$ ions) outside the cell, then to install the partially optimized electrode in the cell and perform the second cleaning stage (extraction of the $H^+$ ions) inside the cell.

A third main aspect of the present invention relates to filling the cell with the electrolyte solution. In DE 19911800 C1 a method and a device for filling an electrochemical cell are described, by which the special problems that are connected to $SO_2$-based electrolytes are solved. Electrolytes of this type are solvated salts with a solvent ($SO_2$) which is gaseous at room temperature. To overcome the resulting special problems, a complex apparatus is proposed, in which a cannula must be guided gas-tight through the inlet opening of the battery up to the electrode stack. This involves the risk that the cannula end may damage the electrode stack and cause an internal short-circuit. In addition, such a thin cannula may be easily clogged by crystallized conductive salt. For filling, the cell is evacuated and, after switching a valve, the electrolyte solution is suctioned into the cell. In this case, the large pressure difference between electrolyte solution and cell interior is a disadvantage. The solvent ($SO_2$) is initially vaporized from the electrolyte solution. The danger of crystallization of the conductive salt, and therefore clogging of the filling device, is thus substantially increased.

In contrast, the present invention suggests a substantially simpler method which is preferably used in connection with the two other main aspects, but also has independent significance. In this case, the transfer of the electrolyte solution includes the following partial steps:

The interior of the housing is filled with gaseous $SO_2$;
a fill opening of the housing is attached gas-tight to a vessel which contains the electrolyte solution with a concentration of $SO_2$, which is such that the gaseous $SO_2$ is readily dissolved in the electrolyte solution; and
the electrolyte solution is allowed to flow into the housing driven by the partial vacuum resulting from the dissolving of the $SO_2$.

More detailed explanations will be provided below on the basis of the figures. The method allows in a simple way a complete filling of the cell with an $SO_2$-based electrolyte.

According to a fourth main aspect, the present invention relates to a problem which results from the formation of a cover layer on the negative electrodes, in particular in cells having an $SO_2$-based electrolyte, due to the electrochemical conditions during the first charging of the cell. In the context of the present invention, it has been established that this cover layer formation is the cause of a substantial reduction of the discharge capacity of the cell and that an optimization in this regard may be achieved by transferring the active metal required for forming the cover layer from a reserve supply to one of the electrodes. In this process the reserve supply is in contact with the electrolyte solution, an auxiliary electrode is in electrical contact with the electrolyte solution,
an electrical line connection is established between the auxiliary electrode and the electrode to which the active metal is to be transferred, and
the transfer of the active metal is caused by an electrical current flowing between the auxiliary electrode and the electrode to which the active metal is transferred.

This main aspect will be explained hereafter—without restriction of the generality—on the basis of cells in which the active metal is an alkali metal. In this case, the cover layer comprises an alkali metal dithionite ($A_2S_2O_4$), i.e. $Li_2S_2O_4$ in the case of a lithium cell. The cover layer formation occurs because of electrochemical conditions which may be described in simplified form as relating to the fact that the cover layer formation reaction occurs at a voltage (in the case of a lithium cell at 3 volt versus $Li/Li^+$) which is lower than the normal operating voltage of the cell. Therefore, the dithionite is first formed, before metallic alkali metal is stored on the negative electrode and/or in the negative electrode, thereby charging the cell.

The lithium (mentioned here again as an example for other alkali metals) for the formation of the $Li_2S_2O_4$ normally originates from the positive electrode. This has the result that already in the first charging cycle, a part of the lithium actually required for the cell capacity is consumed. This problem is in particular serious if the active mass of the negative electrode is very porous and thus has a large interior surface. A correspondingly large cover layer surface is formed and thus a larger share of the lithium initially contained in the positive electrode (for example, approximately 25%) is consumed for the cover layer formation in the first charging cycle. This problem especially exists if the negative electrode is an insertion electrode, in particular if it is based on graphite.

Various embodiments of the fourth main aspect differ with respect to the source of the additional active metal, the auxiliary electrode used, and with respect to the electrode which is the target of the transfer of the additional active metal (hereafter, "target electrode").

The following variants of applying the reserve supply of the active metal may in particular be used and may in principle be combined with one another:

The active metal may be brought into contact (preferably by immersion) with the electrolyte as a pure metal (i.e., not chemically bonded).
An additional quantity of electrolyte may be provided in a container outside the housing of the cell or in the cell itself. In the first case, the additional electrolyte is connected to the electrolyte in the cell via an electrolyte bridge (which allows ion transport).
The additional active metal may be used in the form of a suitable compound, in the case of an alkali metal A, preferably as its dithionite $A_2S_2O_4$.

The auxiliary electrode may, in principle, be formed by a conductive element which is immersed in the electrolyte solution in addition to the components required for the operation of the cell. Preferably, however, the housing of the cell itself, or more precisely at least an electrically conductive part of its inner wall, is used as the auxiliary electrode. If the source of the additional metal is a metallic conductor, it may itself form the auxiliary electrode.

The target electrode may be both the negative electrode and the positive electrode of the cell.

The transfer of the active metal from the reserve supply to the negative electrode should take place after the filling-in of the electrolyte, but before the first charging of the cell, and should be continued until a cover layer has formed on the surface of the electrode in approximately the same quantity as during normal charging of the cell (before metallic alkali metal is stored on and/or in the negative electrode).

In the case of the positive electrode, the object is to replace, by the additional supply of the alkali metal, the loss which has occurred in the positive electrode as a result of the cover layer formation during a preceding charging. In this case, after the filling-in of the electrolyte, the cover layer is formed on the negative electrode by charging the cell and this charging procedure is preferably continued until metallic alkali metal is stored on the negative electrode and/or in the negative electrode, whereby the cell is charged. Thereafter the alkali metal extracted from the positive electrode during the charging procedure is replaced by supplying active metal thereto.

The present invention will be explained in more detail hereafter on the basis of the figures. The features illustrated and described may be used individually or in combination to provide preferred embodiments of the present invention.

Figure 1:
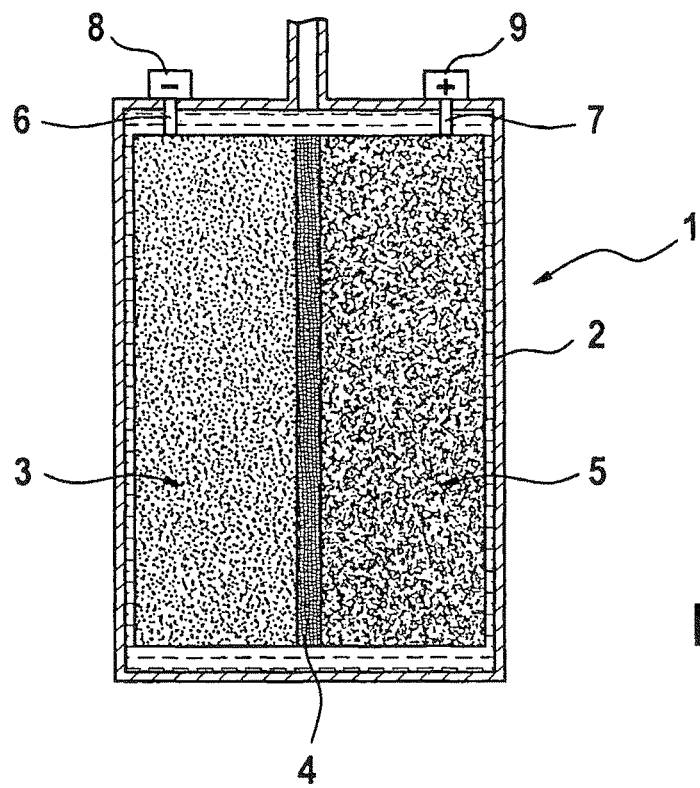
FIG. 1 shows a schematic cross-section through a battery cell according to the present invention.

FIG. 1 schematically shows an electrochemical battery cell 1 having a housing 2. The interior thereof contains a sandwich arrangement of layers, namely a negative electrode 3, a porous insulation layer 4, and a positive electrode 5. The electrodes 3, 5 are connected via electrical leads 6, 7 to terminal contacts 8, 9, via which the cell may be connected to a charging device for charging or to an electric energy consumer during use.

The construction of the cell is largely conventional and does not need to be explained in greater detail. An important feature is that no separator is present between the electrodes 3, 5. Rather the cell contains a porous insulator layer 4, which promotes the growth of active metal therethrough, which active metal is during charging of the cell deposited on the surface of the negative electrode facing toward the positive electrode 5. Thereby local contacts occur between the active metal and the surface of the positive electrode 5 facing toward the negative electrode 3. This causes local short-circuits.

Figure 2:
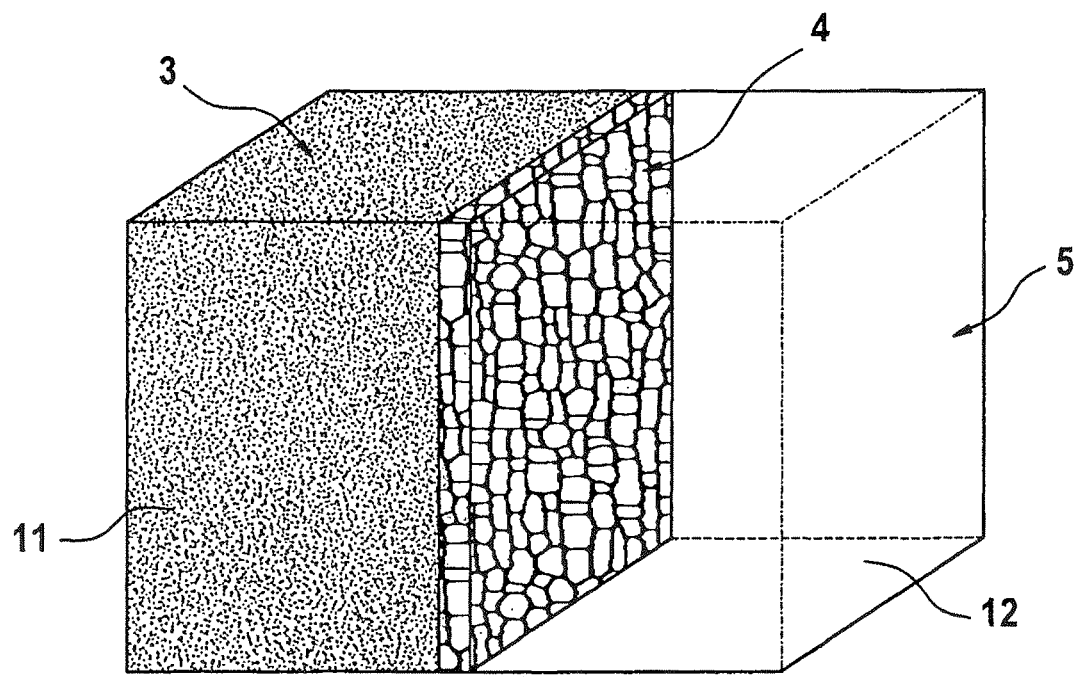
FIG. 2 shows a perspective illustration of the principles of the arrangement and the size ratios of the electrode masses in an exemplary embodiment of the present invention.

FIG. 1 and, more clearly. FIG. 2 show that the electrodes 3, 5 are preferably very much thicker than the insulator layer 4. The insulator layer 4 preferably has a thickness of at most 100 μm, while the electrodes typically have a thickness of approximately 0.1 mm to 2 mm. These numerical values show that the illustration in the figures is approximately to scale with respect to the thickness relationships, but not with respect to the absolute thickness of the layers. Rather, a commercial battery typically contains a packet made of a plurality of thin layers. In this regard, the present invention does not differ from typical batteries, except for the features described here.

The relatively large thickness of the electrodes 3 and 5 is due to the fact that in the preferred exemplary embodiment shown, both electrodes have an electrically conductive electrode mass 11 and 12, respectively, in which the ions of the active metal are received during charging and/or discharging of the cell. Suitable materials have already been mentioned. The negative electrode 3 is especially preferably a graphite electrode, its (preferably porous) electrode mass 11 comprising mainly carbon. The positive electrode is preferably an intercalation electrode, with an electrode mass 12 made of lithium cobalt oxide, preferably also having a porous structure. In the discharged state, the lithium is stored in the interior of the positive electrode. During charging, lithium ion migrate through the porous insulator layer 4 into the electrode mass 11 of the negative electrode. In addition, in specific operating states, the active metal is deposited at the boundary between the electrode mass 11 and the porous insulator layer 4, as explained above. In this case, the active metal penetrates into the pores of the insulator layer 4 and finally grows through the porous insulator layer 4 up to the boundary between the positive electrode 5 and the insulator layer 4, where the explained local short-circuits occur.

The electrical connection required between the electrode masses 11, 12 and the leads 6, 7 is not illustrated in FIGS. 1 and 2. It is ensured by metallic conductor elements which may typically be connected to the electrode masses 11, 12. For example, thin conductor sheets on the surface of the electrode masses 11 and 12 facing away from the porous insulator 4 may be used, but suitable alternatives are porous metal structures, e.g. in the form of metal foams, in which the electrode mass is partially or completely incorporated. No further explanation is required in this regard either, because constructions of this type are known from the related art.

Figure 3:
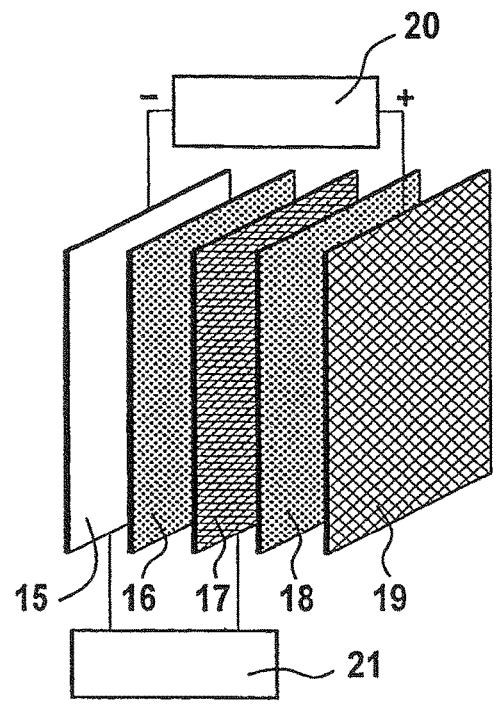
FIG. 3 shows a perspective schematic illustration to explain a method for the experimental selection of a suitable material for a porous insulator layer.

As was explained above, it is not possible to specify with general validity specific values of the design features of the porous insulator layer 4 (for example, with respect to its porosity and its structure components), by which the functions required in the context of the present invention (permeability for active mass deposited on the negative electrode, but ensuring locally delimited short-circuits) are achieved. The suitability of a material provided for the insulator layer for a specific cell may, however, be experimentally tested easily. A suitable experimental setup is illustrated in very schematic form in FIG. 3. It comprises the following layer sequence:

Negative electrode 15 made of nickel metal; both a thin metal sheet and also a foam or stretched metal made of nickel are suitable.

Test material 16: material to be assayed regarding its suitability for the insulator layer 4.

Auxiliary electrode 17 made of nickel metal: it must be liquid-permeable and may e.g. be made of stretched metal or perforated sheet metal.

Separator 18: a typical separator material is suitable. In the experimental setup only its electrically insulating properties, with simultaneous permeability for the electrolyte, are important.

Positive electrode 19: $LiCoO_2$ in nickel foam.

The layers are stacked one on top of another and compressed together using a frame (not shown). The entire setup is immersed in an $SO_2$-based electrolyte solution, having a composition which corresponds to the electrolyte solution of the planned cell.

The shown experimental cell is charged using a charging device 20, whereby lithium is extracted from the positive electrode 19 and deposited in the negative electrode (as previously described for the cell of FIGS. 1 and 2). During the charging procedure, the potential difference between the negative electrode and the auxiliary electrode is monitored using a voltage measuring device 21. It is normally 3.3 volts (voltage of a lithium-nickel element). When lithium grows through the insulator layer 16 up to the auxiliary electrode 17, this results in a drop of the potential difference. At this point of time, the measurement is terminated and the experimental cell is disassembled. By visual examination of the insulator layer (on the side facing toward the auxiliary electrode 17) the type of the lithium growth may be established. The points at which the lithium has grown through and the possible accumulations of lithium may be recognized well. It may therefore be examined whether, as desired, the lithium has penetrated the tested layer 16 only at locally delimited points and, as a result, is suitable as a porous insulator layer for the present invention.

Figure 4:
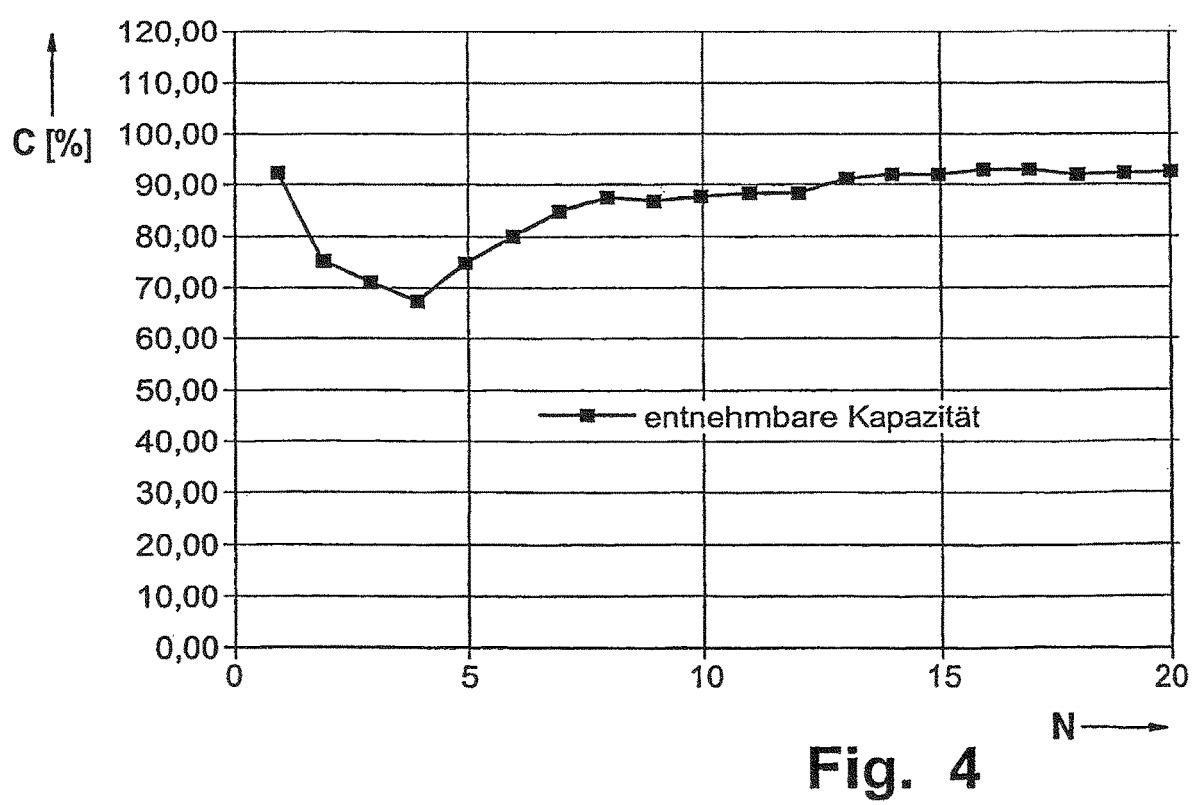
FIG. 4 shows a graph of measurement results from the experimental testing of the first main aspect of the present invention.

FIG. 4 shows results of the experimental testing of a separator-free measurement cell according to the present invention. In this particular case, the cell had a positive electrode made of $LiCoO_2$ and a negative electrode operating with direct deposition of metallic lithium in a porous structure of silicon carbide, which structure is in direct contact to the electrode mass of the positive electrode. $LiAlCl_4 \times 1.5\ SO_2$ was used as the electrolyte.

The capacity C of the cell in percentage of the nominal capacity is plotted in relation to the number N of the charging and discharging cycles. After an initial capacity loss due to structural inhomogeneities of the negative electrode, the capacity stabilizes at 90%. This shows the functional capability of the separator-free design.

Figure 5:
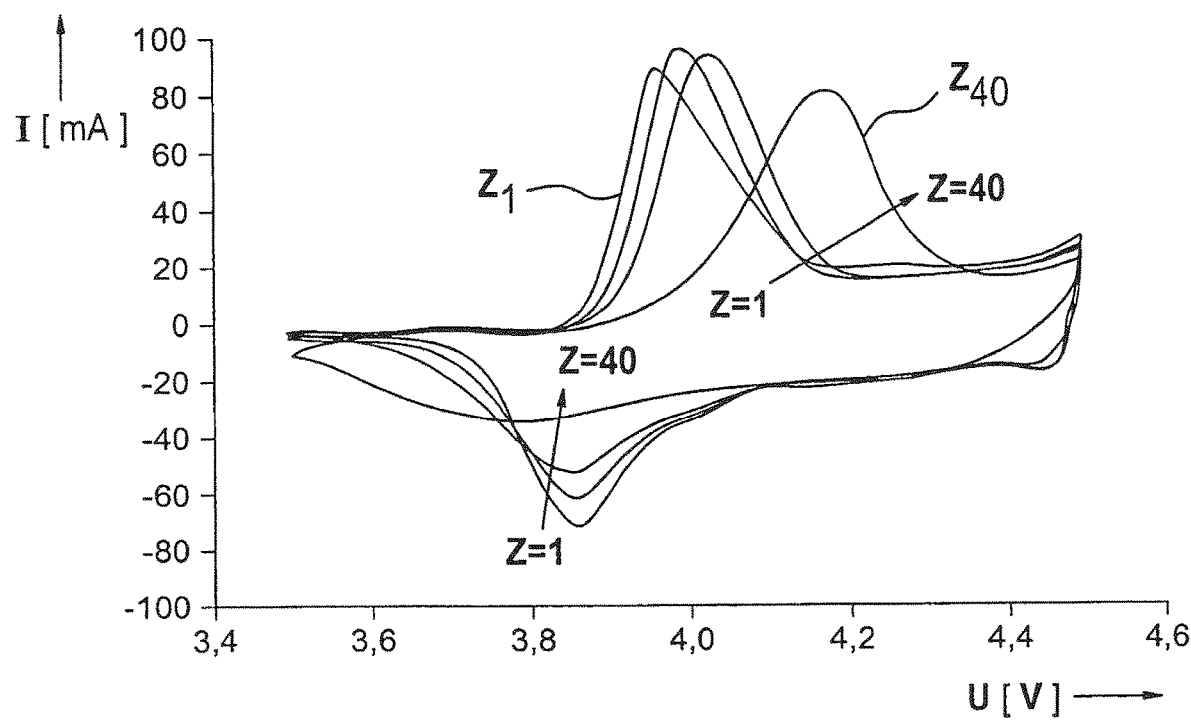
FIG. 5 and FIG. 6 show cyclic voltammograms from the experimental testing of the second main aspect of the invention.
Figure 6:
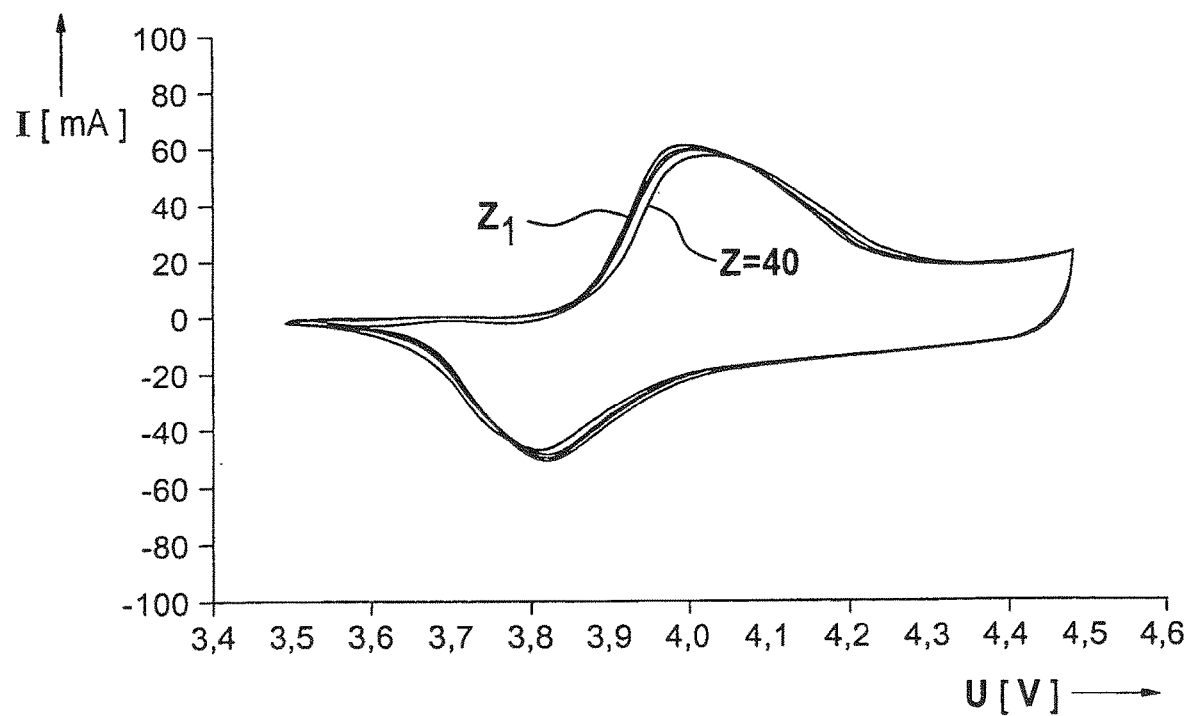

FIGS. 5 to 8 are results which were obtained during experimental testing of the second main aspect of the present invention. In this case, positive electrodes which have been optimized according to the present invention were compared to non-optimized electrodes. The experimental setup had the following features:

geometrical electrode area: 1 cm$^2$
electrode capacity: 40 mAh
electrolyte solution: $LiAlCl_4 \times 1.5\ SO_2$
electrode material: $LiCoO_2$ With a typical experimental cell ("E cell" having a reference electrode for zero-current measurement of the potential), cycles were performed in which the voltage was changed between 3.5 V and 4.5 V at a cycle speed of 0.2 mV/s. FIGS. 5 and 6 show cyclic voltammograms which have been obtained using an electrode not optimized according to the present invention and, using an electrode optimized according to the present invention, respectively. The measured current I in mA is plotted against the voltage U applied to the cell in V against the Li/Li$^+$ half cell. Four cycles are shown in each case, including the first cycle $Z_1$ and the last cycle $Z_{40}$.

For a cell having a positive electrode which was not optimized according to the present invention. FIG. 5 shows a substantial change of the cyclic voltammogram, mainly regarding the position of the anodic peak which is shifted towards higher voltages. While it is in the first cycle still substantially below 4 V, it is at nearly 4.2 V in the fortieth cycle. This corresponds to an increase of the internal resistance of the cell, which according to the findings of the inventors is caused by the passivation of the positive electrode.

The results illustrated in FIG. 6 show that the optimization of the electrode according to the present invention results in practically unchanged cyclic voltammograms during 40 cycles: The electrical values of the cell, in particular its internal resistance, remain constant.

Figure 7:
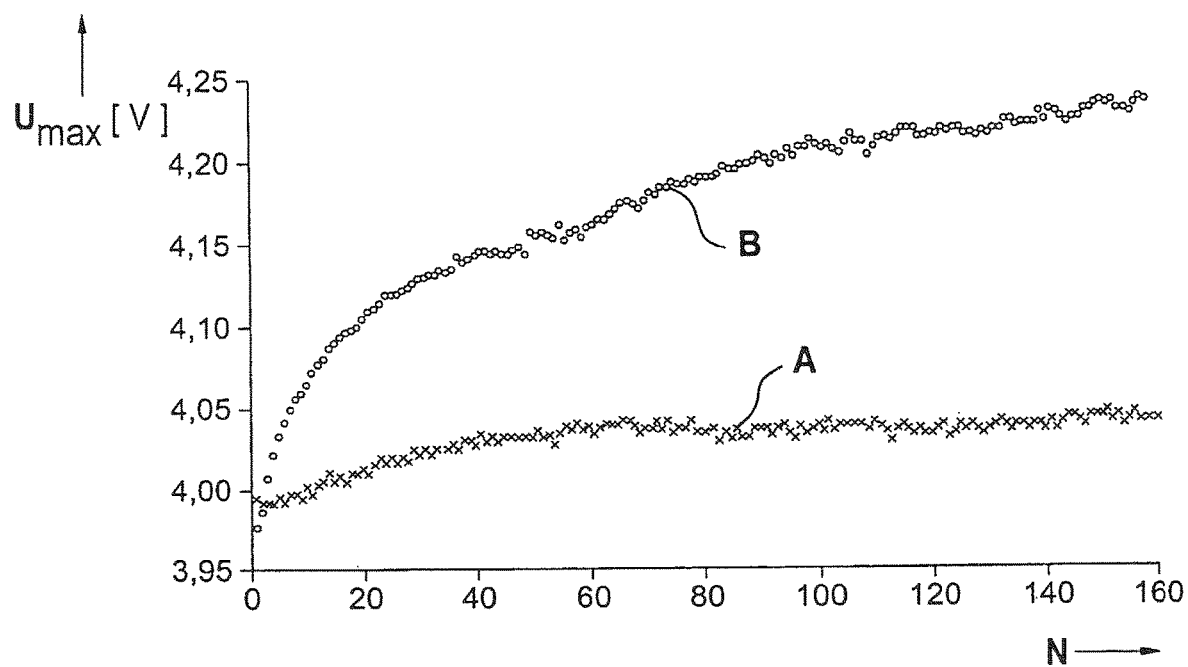
FIG. 7 shows a summary of results obtained on the basis of cyclic voltammograms as shown in FIGS. 5 and 6.

These results are summarized in FIG. 7. Here, the change of the maximum of the peak ($U_{max}$ in volts) is plotted against the cycle number for cells having an electrode optimized according to the present invention (curve A) and for cells having an electrode not optimized according to the present invention (curve B), the data being based on more than 150 cycles. This plot also shows that without the electrode optimization of the invention, the peak position and therefore the internal resistance of the cell change continuously, while these cell data remain nearly constant if an electrode optimized according to the present invention is used.

Figure 8:
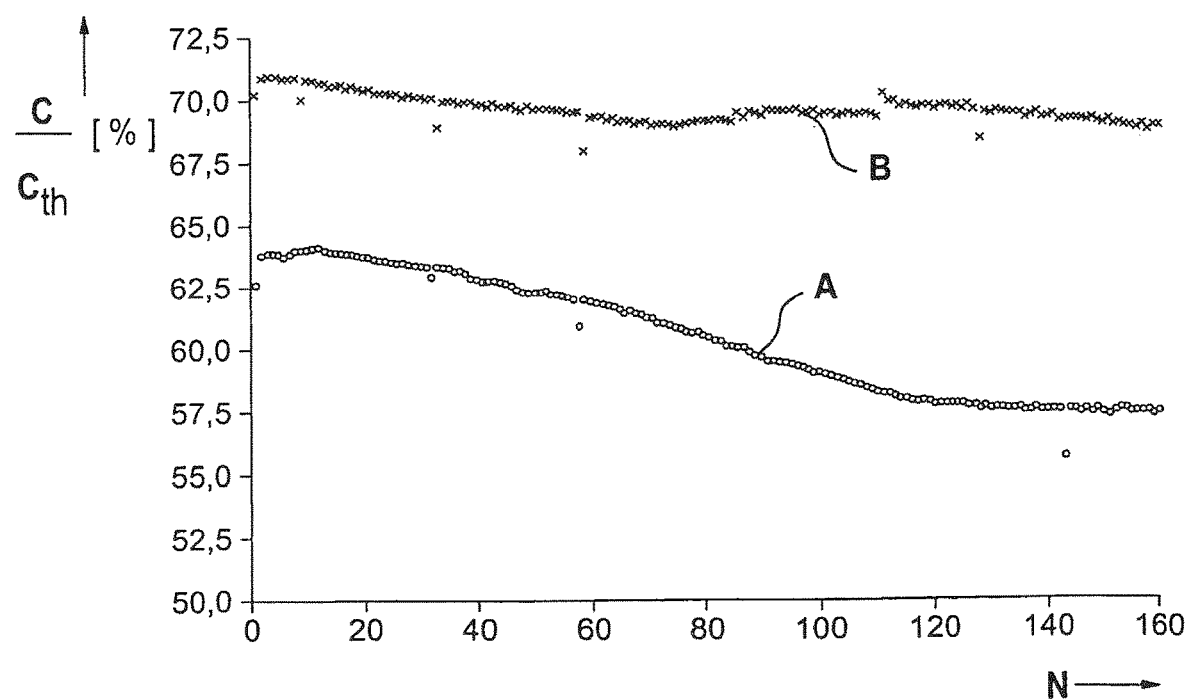
FIG. 8 shows a graph of the discharge capacity of cells as a function of the number of charging and discharging cycles.

FIG. 8 shows the dependence of the electrical discharge capacity (in percent of the theoretical capacity) on the number N of the charging and discharging cycles for a cell having an electrode optimized according to the invention (curve A) and a cell having a non-optimized electrode (curve B). These characteristics are also substantially improved by the present invention: The initial capacity is approximately 7% higher. In addition, the capacity reduction caused by the repeated charging and discharging of the cell, is substantially less.

Figure 9:
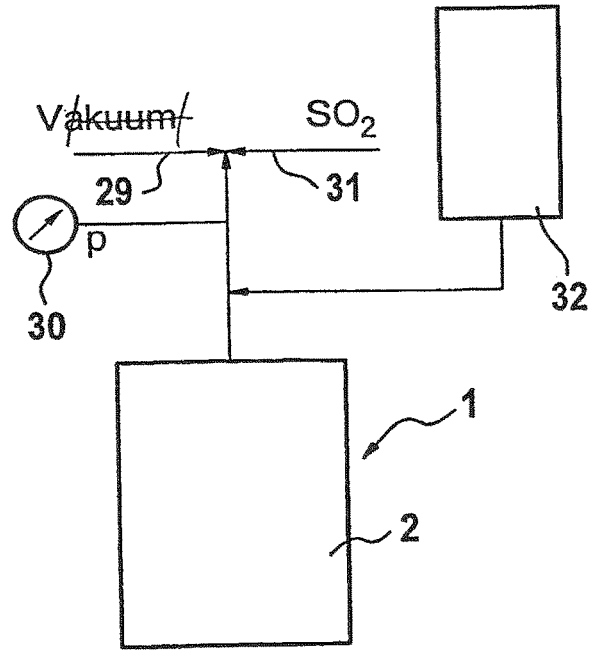
FIG. 9 shows a schematic diagram to explain the third main aspect of the present invention.

FIG. 9 illustrates the filling of the cell with electrolyte solution according to the third main aspect of the present invention. At the illustrated point of time, the electrodes and the porous insulator layer are already positioned in the housing 2 of the cell 1, as shown, for example, in FIG. 1. The filling procedure comprises the following steps:

Firstly the housing 2 of the cell 1 is evacuated via line 29 (V=vacuum). The procedure may be controlled using a pressure measuring device 30. Gaseous $SO_2$ is then supplied via the line 31, so that the interior of the housing 2 is filled with gaseous $SO_2$.

Next the filling with an electrolyte solution, which is provided in a container 32, is performed. Since its $SO_2$ concentration is relatively low, the gaseous sulfur dioxide present in the cell 1 readily dissolves in the electrolyte solution when the connection between the housing 2 and the container 32 is opened. In other words, a weakly exothermic reaction with the electrolyte solution occurs. The quantity of gas in the housing 2 is thus reduced. A partial vacuum is generated in the cell 1, by which further electrolyte is suctioned from the container 32. The electrolyte penetrates into all pores of the layers present in the interior of the cell 1. This is additionally supported if a partial quantity of the conductive salt is already present in the cell at this point of time (for example, as a result of a cleaning step according to the second main aspect).

Figure 10:
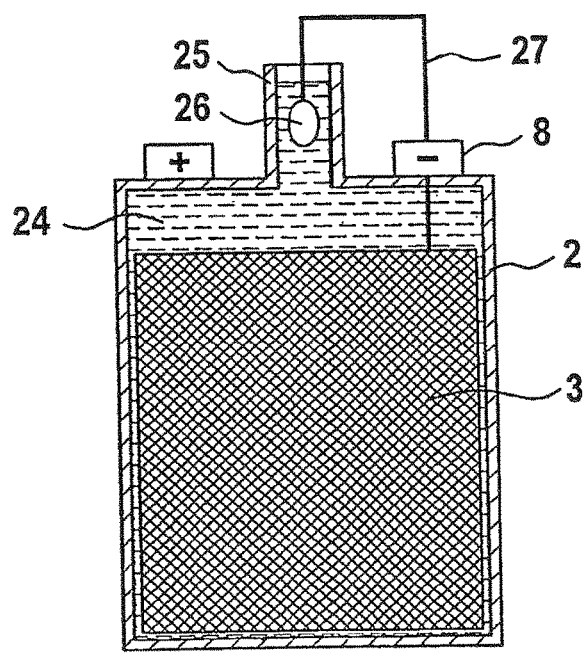
FIG. 10 shows a schematic diagram to explain a first variation of the fourth main aspect of the invention.
Figure 11:
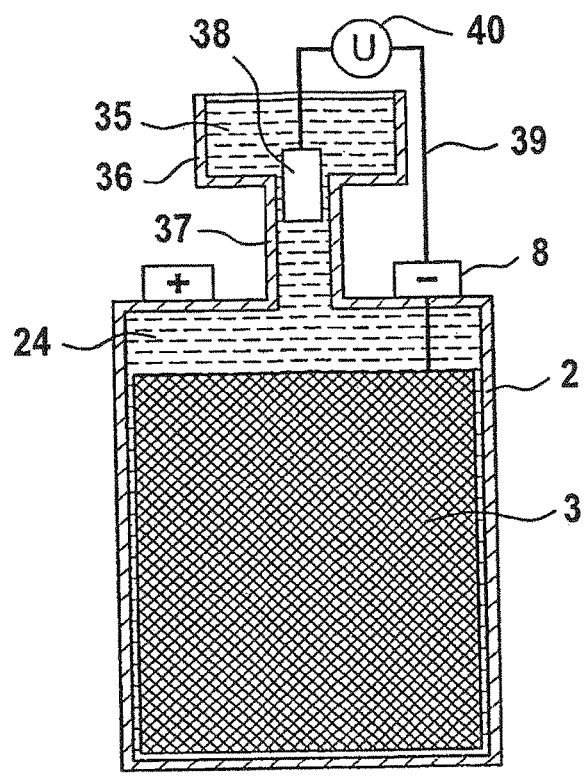
FIG. 11 shows a schematic diagram to explain a second variation of the fourth main aspect of the invention.
Figure 12:
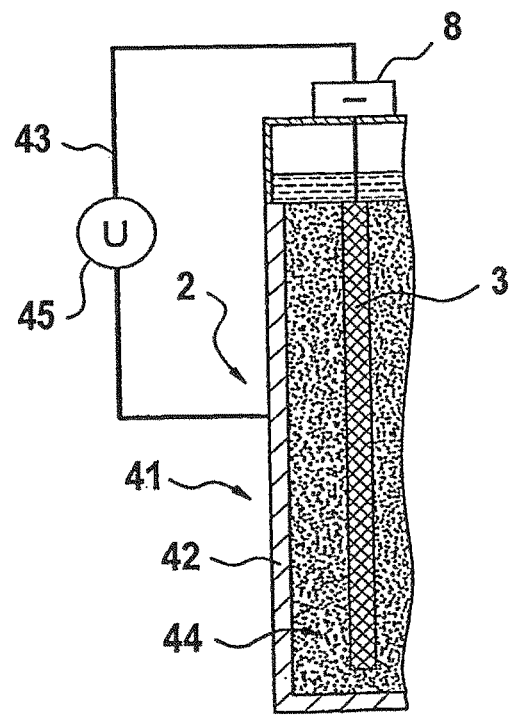
FIG. 12 shows a schematic diagram, in a partial sectional illustration, to explain a third variation of the fourth main aspect of the present invention.

FIGS. 10 to 12 illustrate the fourth main aspect of the present invention. The explanation is given on the basis of cells having lithium as the active metal, a negative graphite insertion electrode, and a positive intercalation electrode with an electrode mass made of lithium cobalt dioxide. It may be transferred easily to the general case of other suitable active metals and electrode materials.

FIG. 10 shows a cell 2 filled with electrolyte 24. The positive electrode is not visible in this drawing, but is of course present. The cell 1 has a connecting tube 25 suitable for filling, through which a piece of lithium metal 26 may be immersed into the electrolyte 24. The lithium metal 26 is electrically connected to the negative pole 8 of the battery, i.e., to the negative electrode 3. Without applying an external voltage, a gradual dissolution of the lithium 26 takes place with this arrangement, while a cover layer of lithium dithionite is simultaneously formed on the negative electrode. During this procedure the battery circuit between the positive and the negative electrodes is open.

In this embodiment, the lithium metal 26 simultaneously forms the auxiliary electrode and the reserve supply of the active metal. The following reactions occur at the negative electrode NE and the auxiliary electrode AE:

$$2Li^+ + 2SO_2 + 2e^- \rightarrow 2Li_2S_2O_4 \quad\quad NE:$$

$$2Li \rightarrow 2Li^+ + 2e^- \quad\quad AE:$$

Free electrons generated by the reaction at the auxiliary electrode flow via the line connection 27 to the negative electrode and are consumed by the reaction occurring there. Because of the thermodynamic conditions, no voltage source is required in the line 27.

In the embodiment illustrated in FIG. 10, the cover layer on the negative electrodes is formed before the first charging of the cell, while no lithium from the positive electrode is consumed. The lithium content of the positive electrode is therefore fully available for the charging and the subsequent discharging of the cell.

An arrangement similar to FIG. 10 may also be used in order to "regenerate" the positive electrode after the first charging procedure, by replacing the loss of active metal which occurs in the positive electrode as a result of the cover layer formation during a preceding charging procedure. In this case, the positive electrode is the target electrode of the lithium transfer, i.e., after the first charging of the cell, the line connection 27 between the lithium metal 26 and the positive electrode is closed, while the battery circuit between the positive and the negative electrodes is simultaneously open. Lithium ions are thus purposely introduced into the positive electrode, the following reaction occurring there:

$$Li_{(1-x)}CoO_2 + xLi^+ + xe^- \rightarrow LiCoO_2 \quad\quad PE:$$

FIG. 11 shows an embodiment in which an additional quantity of electrolyte 35 is provided as a reserve supply of lithium. In the embodiment shown the additional quantity of electrolyte is located in a container 36, which is connected via an electrolyte bridge 37 to the electrolyte 24 in the cell 2. An auxiliary electrode 38 is connected via a line connection 39 to the negative terminal contact 8 of the cell and thus to the negative electrode 3. By a voltage source 40 lying in the line connection 39, an (experimentally optimized) electrical voltage is applied between the auxiliary electrode 38 and the negative electrode 3, which causes the following reactions at the electrodes:

$$2Li^+ + 2SO_2 + 2e^- \rightarrow 2Li_2S_2O_4 \quad\quad NE:$$

$$2AlCl_4^- \rightarrow 2AlCl_3 + Cl_2 + 2e^- \quad\quad AE:$$

The reaction at the auxiliary electrode provides, via the line connection 39, the electrons which are required for generating the cover layer on the negative electrode. The required $Li^+$ ions are available from the additional quantity of the electrolyte (i.e., in the conductive salt contained therein).

Variations of the arrangement illustrated in FIG. 11, to regenerate the positive electrode after the first charging procedure and the resulting loss of lithium, are possible. In such embodiments again the line connection to the positive terminal contact of the cell is provided. However, the transition of the lithium occurs after the first charging procedure.

FIG. 12 shows an embodiment in which the auxiliary electrode is formed by a metallic wall 42 of the housing 41 of the cell 2. The line connection 43 is accordingly provided between the housing 41 and the negative terminal contact 8. The reserve supply of lithium is provided in the form of lithium dithionite 44, which is filled into the cell (as a powder, for example) in such manner that it is located in the intermediate space between the inner wall of the housing 41 and the negative electrode 3. The reaction products of the reactions explained hereafter thus have short diffusion pathways to both the auxiliary electrode (housing wall 42) and also to the target electrode (the negative electrode 3 here).

Driven by the voltage of a voltage source 45 connected into the line connection 43, the following reactions occur at the electrodes:

$$2Li^+ + 2SO_2 + 2e^- \rightarrow 2Li_2S_2O_4 \quad\quad NE:$$

$$2AlCl_4^- \rightarrow 2AlCl_3 + Cl_2 + 2e^- \quad\quad AE:$$

The reaction at the auxiliary electrode (housing wall) results in the following further reactions:

$$Cl_2 + SO_2 \rightarrow SO_2Cl_2 \quad\quad (a):$$

$$SO_2Cl_2 + Li_2S_2O_4 \rightarrow 2LiCl + 3SO_2 \quad\quad (b):$$

$$2LiCl + 2AlCl_3 \rightarrow 2Li^+ + 2AlCl_4^- \quad\quad (c):$$

In reaction (a), the chlorine formed at the auxiliary electrode reacts with the $SO_2$ from the electrolyte to form sulfuryl chloride, which reacts further in reaction (b) with the lithium dithionite provided as the lithium reserve supply to form lithium chloride and sulfur dioxide. Reaction (c) results—proceeding from products of the precursor reactions—in the formation of lithium ions which react further in the cover layer formation reaction at the negative electrode.

In this case again the positive electrode may be the target electrode, the same explanations as in the preceding embodiments applying analogously.

The invention claimed is:
1. An electrochemical battery cell comprising:
a negative electrode;
an electrolyte containing a conductive salt, wherein the electrolyte is based on $SO_2$;
a positive electrode; and
a porous insulator layer in direct contact with the positive electrode, the porous insulator layer being located between the positive electrode and the negative electrode, running adjacent and parallel to the positive electrode, the porous insulator layer including a plurality of pores, at least one of the pores permitting growth of a whisker or dendrite through the porous insulator layer, wherein:
the battery cell is configured such that active metal deposited on the negative electrode during the charging of the cell is configured to come into contact with the positive electrode so as to enable short-circuit reactions to occur at a surface of the positive electrode, the battery cell is free of a separator or barrier impermeable to the active metal that is located between the negative electrode and the positive electrode, and the porous insulator layer is configured to allow the active metal deposited on the negative electrode to grow during the charging of the cell through the at least one pore of the insulator layer to the surface of the positive electrode, such that any short circuits occurring as a result of the contact of active metal with the positive electrode are locally limited.

2. The battery cell of claim 1, wherein the negative electrode is adapted for taking up positive metal ions of the conductive salt into its interior during charging of the cell.

3. The battery cell of claim 2, wherein the negative electrode comprises an electrically conductive electrode mass into which the metal ions of the conductive salt are taken up during charging of the cell and the porous insulator layer is located between the electrically conductive electrode mass of the negative electrode and the positive electrode.

4. The battery cell of claim 3, wherein the electrically conductive electrode mass of the negative electrode contains carbon.

5. The battery cell of claim 1, wherein the negative electrode has a planar, electronically conductive substrate and a nonconductive deposition layer bonded to the substrate, the deposition layer being formed and arranged such that active metal deposited on the surface of the substrate penetrates into its pores and is deposited further therein and no barrier layer impermeable to the active metal is located between the deposition layer and the positive electrode, the porous insulator layer being formed by the deposition layer or being a separate layer.

6. The battery cell of claim 1, wherein the porous insulator layer contains a particle-shaped, fiber-shaped or tube-shaped pore structure material.

7. The battery cell of claim 6, wherein the pore structure material contains an oxide, a carbide, or a chemically stable silicate.

8. The battery cell of claim 1, wherein the porous insulator layer contains a binder based on a terpolymer of tetrafluoroethylene, hexafluoropropylene, and vinylidene fluoride.

9. The battery cell of claim 1, wherein an active metal is selected from the group comprising the alkali metals, the alkaline earth metals, and the metals of the second secondary group of the periodic system.

10. The battery cell of claim 9, characterized in that active metal is lithium, sodium, calcium, zinc, or aluminum.

11. The battery cell of claim 1, wherein the positive electrode contains a metal oxide.

12. The battery cell of claim 1, wherein the positive electrode contains an intercalation compound.

13. The battery cell of claim 12, wherein the positive electrode contains an intercalation compound comprising $CoO_2$.

14. The battery cell of claim 1, wherein the porous insulator layer is configured to permit the growth of active metal therethrough.

15. An electrochemical battery cell comprising:
a negative electrode;
an electrolyte containing a conductive salt;
a positive electrode; and
a porous insulator layer in direct contact with the positive electrode, the porous insulator layer being located between the positive electrode and the negative electrode, running adjacent and parallel to the positive electrode, the porous insulator layer including a plurality of pores, at least one of the pores permitting growth of a whisker or dendrite through the porous insulator layer, wherein:

the electrolyte is based on $SO_2$;

the battery cell is configured such that active metal deposited on the negative electrode during the charging of the cell is configured to come into contact with the positive electrode so as to enable short-circuit reactions to occur at a surface of the positive electrode;

the porous insulator layer is configured to allow the active metal deposited on the negative electrode to grow during the charging of the cell through the at least one pore of the insulator layer to the surface of the positive electrode;

the battery cell is free of a separator or barrier impermeable to the active metal that is located between the negative electrode and the positive electrode; and said porous insulator layer having a structure and arrangement in relation to the positive electrode such that contact between the active metal of the negative electrode and the positive electrode is restricted to local sites of the surface of the positive electrode, whereby any short circuits occurring as a result of the contact of active metal with the positive electrode are locally limited.

16. The battery cell of claim 15, wherein the negative electrode is adapted for taking up positive metal ions of the conductive salt into its interior during charging of the cell.

17. The battery cell of claim 16, wherein the negative electrode comprises an electrically conductive electrode mass into which the metal ions of the conductive salt are taken up during charging of the cell and the porous insulator layer is located between the electrically conductive electrode mass of the negative electrode and the positive electrode.

18. The battery cell of claim 17, wherein the electrically conductive electrode mass of the negative electrode contains carbon.

19. The battery cell of claim 15, wherein the negative electrode comprises a planar, electronically conductive substrate and a nonconductive deposition layer bonded to the substrate, the deposition layer being formed and arranged such that active mass deposited on the surface of the substrate penetrates into its pores and is deposited further therein, the porous insulator layer being formed by the deposition layer or being a separate layer.

20. The battery cell of claim 15, wherein the porous insulator layer contains a particle-shaped, fiber shaped or tube-shaped pore structure material.

21. The battery cell of claim 20, wherein the pore structure material contains an oxide, a carbide, or a chemically stable silicate.

22. The battery cell of claim 15, wherein the porous insulator layer contains a binder based on a terpolymer of tetrafluoroethylene, hexafluoropropylene, and vinylidene fluoride.

23. The battery cell of claim 15, wherein the positive electrode layer contains a metal oxide.

24. The battery cell of claim 15, wherein the positive electrode layer contains an intercalation compound.

25. The battery cell of claim 15, wherein the positive electrode layer contains an intercalation compound comprising $CoO_2$.

26. The battery cell of claim 15, wherein the active metal is selected from the group comprising the alkali metals, the alkaline earth metals, and the metals of the second secondary group of the periodic system.

27. The battery cell of claim 26, characterized in that the active metal is lithium, sodium, calcium, zinc, or aluminum.

28. The battery cell of claim 15, wherein the porous insulator layer has a thickness of at most 0.1 mm.

29. The battery cell of claim 15, wherein at least one of the positive and negative electrodes has a thickness between 0.1 mm and 2 mm.

* * * * *